(12) United States Patent
Kasuga et al.

(10) Patent No.: US 8,833,329 B2
(45) Date of Patent: Sep. 16, 2014

(54) FASTENING STRUCTURE OF POWER UNIT

(75) Inventors: Tomoyuki Kasuga, Toyota (JP); Takashi Shimizu, Toyota (JP); Yukinobu Nishikawa, Chiryu (JP); Yota Mizuno, Nissin (JP); Yuji Shimada, Nissin (JP); Kenji Odaka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 65 days.

(21) Appl. No.: 13/319,109

(22) PCT Filed: Mar. 31, 2010

(86) PCT No.: PCT/IB2010/000726
§ 371 (c)(1),
(2), (4) Date: Nov. 7, 2011

(87) PCT Pub. No.: WO2010/131085
PCT Pub. Date: Nov. 18, 2010

(65) Prior Publication Data
US 2012/0057929 A1 Mar. 8, 2012

(30) Foreign Application Priority Data
May 13, 2009 (JP) .................................. 2009-116814

(51) Int. Cl.
| | |
|---|---|
| *F02B 67/00* | (2006.01) |
| *F02B 77/00* | (2006.01) |
| *F02B 61/04* | (2006.01) |
| *F02F 7/00* | (2006.01) |
| *F02B 75/00* | (2006.01) |
| *B60K 5/04* | (2006.01) |
| *B60K 17/00* | (2006.01) |

(52) U.S. Cl.
CPC .. *B60K 17/00* (2013.01); *B60K 5/04* (2013.01)
USPC ............... 123/195 R; 123/195 A; 123/195 C; 123/195 E; 123/195 P; 123/195 S; 123/195 AC; 123/195 H; 123/195 HC

(58) Field of Classification Search
USPC ....................................... 123/195 R
See application file for complete search history.

(56) References Cited

U.S. PATENT DOCUMENTS 4,506,561 A * 3/1985 Hayakawa .................. 74/606 R
4,741,225 A * 5/1988 Hall et al. ................... 74/606 R (Continued)

FOREIGN PATENT DOCUMENTS

| EP | 0 922 849 A | 6/1999 |
|---|---|---|
| JP | 61-70543 | 5/1986 |

(Continued)

OTHER PUBLICATIONS

International Search Report in International Application No. PCT/IB2010/000726; Mailing Date: Nov. 11, 2010.

(Continued)

*Primary Examiner* — Lindsay Low
*Assistant Examiner* — Charles Brauch
(74) *Attorney, Agent, or Firm* — Finnegan, Henderson, Farabow, Garrett & Dunner, LLP

(57) ABSTRACT

A hybrid transaxle 200 that is a transmission is provided with a junction surface 20 that contacts a junction surface of an internal combustion engine. A bolt span portion 20a of the junction surface 20 is provided with a protrusion portion 25 that elastically deforms so that the internal combustion engine-side junction surface and the hybrid transaxle 200-side junction surface 20 closely contact each other.

10 Claims, 4 Drawing Sheets

(56) References Cited

U.S. PATENT DOCUMENTS

| | | | | |
|---|---|---|---|---|
| 4,958,537 A | * | 9/1990 | Diehl et al. | 74/606 R |
| 5,095,773 A | | 3/1992 | Okuzumi | |
| 5,342,242 A | * | 8/1994 | Ladd et al. | 464/98 |
| 6,085,855 A | * | 7/2000 | Schanz et al. | 180/219 |
| 6,675,676 B2 | | 1/2004 | Beutler | |
| 7,261,081 B2 | * | 8/2007 | Dondlinger et al. | 123/196 R |
| 2002/0050263 A1 | * | 5/2002 | Asano et al. | 123/195 R |
| 2004/0006871 A1 | * | 1/2004 | Sturtevant et al. | 29/890.08 |
| 2006/0058138 A1 | * | 3/2006 | Morita et al. | 474/144 |
| 2007/0000469 A1 | * | 1/2007 | Liang et al. | 123/195 R |
| 2009/0199810 A1 | * | 8/2009 | Iida | 123/195 R |

FOREIGN PATENT DOCUMENTS

| | | |
|---|---|---|
| JP | 3-5938 | 1/1991 |
| JP | 3-43160 | 4/1991 |
| JP | 4-27251 | 3/1992 |
| JP | 5-15641 | 4/1993 |
| JP | 8-219022 | 8/1996 |
| JP | 11-254983 | 9/1999 |
| JP | 2000-190747 | 7/2000 |
| JP | 2001-295736 | 10/2001 |

OTHER PUBLICATIONS

Written Opinion of the International Searching Authority in International Application No. PCT/IB2010/000726; Mailing Date: Nov. 11, 2010.

Japanese Office Action for JP Appl. No. 2009-116814 dated May 22, 2012.

* cited by examiner

FASTENING STRUCTURE OF POWER UNIT

CROSS-REFERENCE TO RELATED APPLICATIONS

This application is a national phase application of International Application No. PCT/IB2010/000726, filed Mar. 31, 2010, and claims the priority of Japanese Application No. 2009-116814, filed May 13, 2009, the contents of both of which are incorporated herein by reference.

BACKGROUND OF THE INVENTION

1. Field of the Invention

The invention relates to a fastening structure of a power unit for integrally joining an internal combustion engine and a transmission by fastening them together with bolts to form the power unit.

2. Description of the Related Art

Generally, in power units that are mounted in vehicles, such as motor vehicles or the like, an internal combustion engine and a transmission are fastened together with bolts. For example, in a power unit described in Japanese Utility Model Application Publication No. 3-43160 (JP-U-3-43160), an internal combustion engine and a transmission are integrally coupled by fastening them together with a plurality of bolts while a junction surface formed on an end of the cylinder block of the engine and a flange-shape junction surface formed on the case of the transmission are placed in contact with each other.

In a power unit in which an internal combustion engine and a transmission are fastened together with a plurality of bolts in the foregoing manner, a gap is sometimes formed between the junction surface of the internal combustion engine and the junction surface of the transmission due to variations in the working process of the junction surfaces, the mounting error caused when bolts are fastened, the deformation of the junction surfaces caused by thermal expansion occurring during operation of the engine, etc. Incidentally, such a gap tends to be formed in a portion of the junction surfaces in which the fastening force exerted by a bolt acts less easily or less certainly, that is, in a so-called bolt span portion between a bolt-fastened portion and another bolt-fastened portion.

If such a gap is formed between the junction surfaces of the internal combustion engine and the transmission, the junction surfaces vibrate in a portion where the gap is formed, when vibration attributed to a mesh transmission error of a gear train of the transmission or the like is transmitted to the junction surfaces through the case of the transmission.

Then, if the frequency of the vibration transmitted to the junction surfaces from the transmission is close to the eigen frequency of a portion of the junction surfaces where the gap is formed, resonance may possibly occur in the portion where the gap is formed, so that large vibration or noise may occur.

SUMMARY OF THE INVENTION

The invention provides a fastening structure of a power unit which is capable of restraining the vibration or noise that occurs in junction surfaces of an internal combustion engine and a transmission due to vibration transmitted thereto from the transmission.

A first aspect of the invention relates a fastening structure of a power unit formed by fastening an internal combustion engine and a transmission together. This fastening structure includes: a first junction surface provided on the internal combustion engine; a second junction surface provided on the transmission; a plurality of bolts which are respectively inserted into a plurality of insertion holes that are formed in the first junction surface and second junction surface, and which integrally fasten the internal combustion engine and the transmission together while the first junction surface and the second junction surface are placed in contact with each other; and a protrusion portion provided in a bolt span portion that is positioned between insertion holes in at least one of the first junction surface and the second junction surface.

In the fastening structure in accordance with this aspect of the invention, the protrusion portion may elastically deform due to pressing force caused by fastening of the internal combustion engine and the transmission via the bolts in such an elastic deformation manner that the junction surface of the internal combustion engine and the junction surface of the transmission closely contact each other.

According to the foregoing construction, when the junction surfaces separate from each other to form a gap in the bolt span portion due to deformation of the junction surfaces, or the like, that is caused by the processing variations of the junction surfaces, the mounting error caused when the bolts are fastened, or the deformation of the junction surfaces caused by thermal expansion occurring during operation of the engine, the protrusion portion, which has been elastically deformed, tends to restore its original shape while remaining in contact with the junction surface that the protrusion portion faces. Therefore, even when a gap is formed between the junction surface of the internal combustion engine and the junction surface of the transmission, the state of contact between the protrusion portion and the junction surface is maintained at the site where the protrusion portion is provided. Hence, since the junction surfaces are supported due to the protrusion portion, the vibration of the junction surfaces at this gap can be restrained. That is, according to the foregoing construction, it is possible to restrain the vibration or noise that is produced in the junction surfaces of the internal combustion engine and the transmission by the vibration transmitted from the transmission.

In the fastening structure in accordance with the aspect of the invention, a position in the bolt span portion at which the protrusion portion is provided may be set based on frequency of vibration that is transmitted from the transmission so that eigen frequency of the bolt span portion that is provided with the protrusion portion does not overlap with frequency of the vibration transmitted from the transmission.

In the case where the frequency of the vibration transmitted from the transmission and the eigen frequency of each of the junction surfaces at the gap formed between the junction surfaces are the same or close to each other, resonance may sometimes occur at the site of the gap, so that large vibration or noise may occur. In the case where one or more protrusion portions are provided in the bolt span portion, and are placed in contact with the junction surface that they face, the eigen frequency of the bolt span portion changes according to the position and the number of the protrusion portions. According to the foregoing construction, the eigen frequency of the bolt span portion that has a gap between the junction surfaces of the internal combustion engine and the transmission can be manipulated by adjusting the position and number of protrusion portions provided in the bolt span portion. As a result, even in the case where the junction surfaces separate from each other to form a gap in the bolt span portion as the junction surfaces deform due to, for example, thermal expansion caused by the operation of the engine, or the like, the occurrence of resonance caused in the bolt span portion by the vibration transmitted thereto from the transmission is restrained. Thus, the occurrence of large vibration or noise caused by the resonance can be suitably restrained.

In the fastening structure in accordance with the invention, a number of the protrusion portions provided in the bolt span portion may be set based on frequency of vibration that is transmitted from the transmission so that eigen frequency of the bolt span portion that is provided with the protrusion portions does not overlap with frequency of the vibration transmitted from the transmission.

According to the foregoing construction, in the case where the number of protrusion portions provided in the bolt span portion is set on the basis of the frequency of the vibration transmitted from the transmission so that the eigen frequency of the bolt span portion that is provided with the protrusion portions does not overlap with the frequency of the vibration transmitted from the transmission, it is also possible to restrain the occurrence of resonance in the bolt span portion that is caused by the vibration transmitted from the transmission.

In the fastening structure in accordance with this aspect, the protrusion portion may be provided at a position at which an amplitude of eigen vibration that occurs in the bolt span portion due to vibration that is transmitted from the transmission to the junction surfaces becomes maximum.

According to the foregoing construction, the protrusion portion is provided at the position at which the amplitude of the eigen vibration becomes maximum, and the protrusion portion contacts the junction surface at this position. Therefore, vibration of the junction surfaces at this position is effectively restrained, and occurrence of eigen vibration is suitably restrained.

Incidentally, in the fastening structure in accordance with the aspect of the invention, a waveform of eigen vibration may be analyzed beforehand.

In the fastening structure in accordance with the aspect of the invention, the junction surfaces may have an offset from a straight line that connects two of the insertion holes that are positioned at opposite ends of the bolt span portion in which the protrusion portion is provided.

In the junction surfaces positioned between two insertion holes that are positioned at opposite ends of the bolt span portion, pressing force produced by the fastening of bolts is likely to act, so that a gap is unlikely to be formed. On the other hand, if the locus of the junction surfaces extends so as to have an offset from a straight line connecting the two insertion holes positioned at opposite ends of the bolt span portion, the pressing force produced by the fastening of bolts less easily or certainly acts on the junction surfaces, and therefore a gap is more likely to be formed. According to the foregoing construction, it is possible to effectively restrain vibration and noise of a potion in which such a gap is likely to be formed.

In the fastening structure in accordance with the foregoing aspect of the invention, the bolt span portion in which the protrusion portion is provided may have a longer locus on the junction surfaces that connects two of the insertion holes that are at opposite ends of the bolt span portion than another bolt span portion has.

In the bolt span portion, the farther a point is from its adjacent insertion hole through which a bolt is inserted, the less easily or certainly the pressing force caused by the fastening of the bolt acts on the junction surfaces. Therefore, in a bolt span portion whose locus of the junction surfaces is long, the junction surfaces are apt to separate from each other to form a gap therebetween, so that the production of vibration or noise as mentioned above becomes particularly conspicuous.

According to the foregoing construction, it is possible to suitably restrain the production of vibration or noise at the gap formed between the junction surfaces.

In the fastening structure in accordance with the aspect of the invention, the bolt span portion in which the protrusion portion is provided may be a portion in which an end portion of the junction surfaces linearly extends.

In the case where the locus of the junction surfaces linearly extends, the junction surfaces are more likely to vibrate when vibration is transmitted thereto than in the case where the locus of the junction surface is curved. According to the foregoing construction, vibration can be restrained in the foregoing case, too.

In the fastening structure in accordance with the aspect of the invention, the junction surfaces may be formed by a cutting process performed by a milling machine so that the junction surfaces are smooth, and the protrusion portion may be formed by changing height of a cutting blade of the milling machine at a position that corresponds to the protrusion portion, during the cutting process.

According to the foregoing construction, the protrusion portion can be formed in the cutting (or machining) process for smoothing the junction surfaces. Thus, it is possible to form the protrusion portion in the bolt span portion while restraining the increase in the number of operation steps caused by the provision of the protrusion portion and the thereby-caused increase in cost.

In the fastening structure in accordance with the aspect of the invention, the protrusion portion may be formed by fixing a platy member onto at least one of the junction surfaces that are smooth.

In the fastening structure in accordance with the aspect of the invention, the protrusion portion may be protruded in a direction in which the internal combustion engine and the transmission are fastened.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
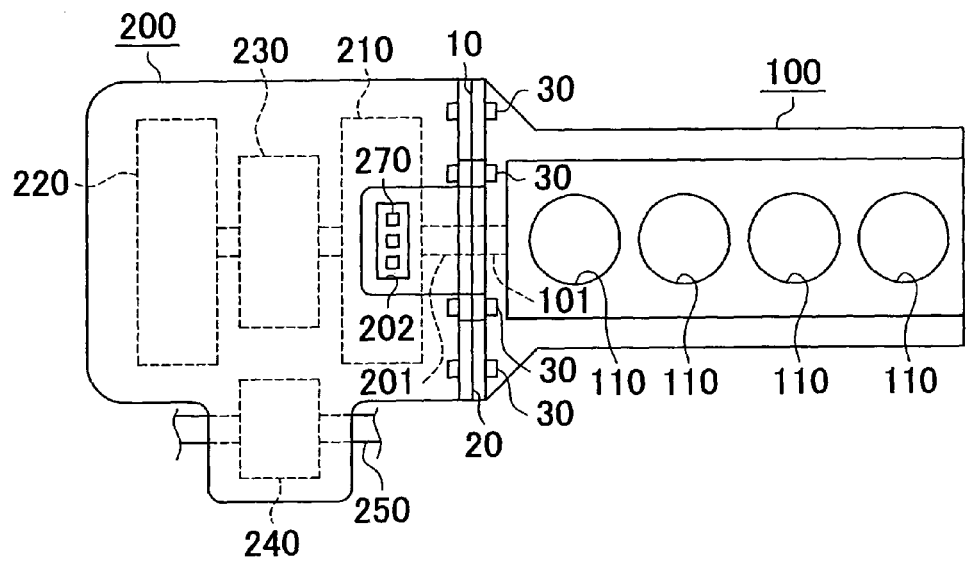
FIG. 1 is a top plan view of a power unit in accordance with an embodiment of the invention.

Hereinafter, a power unit mounted in a hybrid vehicle to which a fastening structure of a power train in accordance with an embodiment of the invention is applied will be described with reference to FIGS. 1 to 5. FIG. 1 is a top plan view of a power unit in accordance with the embodiment of the invention.

As shown in FIG. 1, an internal combustion engine 100 that constitutes the power unit in accordance with the embodiment is an in-line four-cylinder engine in which four cylinders 110 are disposed in a line. An end of a cylinder block of the engine 100 has a junction surface 10 that is joined with a junction surface 20 of a hybrid transaxle 200 that is a transmission of the power unit.

The hybrid transaxle 200 includes a motor-generator 210 that generates electricity, and an electric motor 220 that drives driving wheels. The motor-generator 210 and the electric motor 220 are interconnected via a power splitting mechanism 230. The power splitting mechanism 230 is connected to a differential 240 via a speed reduction gear (not shown). Drive force input to the differential 240 via the power splitting mechanism 230 is transmitted to left and right driving wheels via drive shafts 250. Incidentally, the power splitting mechanism 230, using a planetary gear, divides the drive force of the internal combustion engine 100 input thereto through an input shaft 201 for the motor-generator 210 and for the driving wheels, and transmits thereto the divided drive forces. A case of the hybrid transaxle 200 is provided with the junction surface 20 that is joined with the junction surface 10 of the internal combustion engine 100 as shown in FIG. 1.

Figure 2:
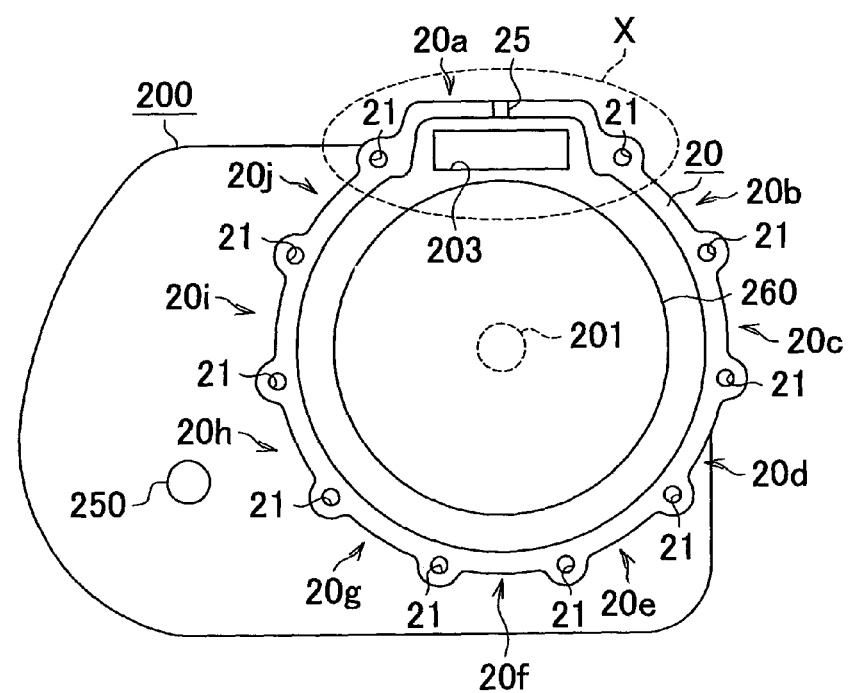
FIG. 2 is a side view of a hybrid transaxle of a power unit in accordance with the embodiment.

FIG. 2 is a side view of the hybrid transaxle 200. As shown in FIG. 2, the junction surface 20 is formed in the shape of a circular ring so as to surround a disc-shaped transaxle damper 260 that links the input shaft 201 of the hybrid transaxle 200 and an output shaft 101 of the internal combustion engine 100 to each other.

As shown in FIG. 2, the junction surface 20 has ten insertion holes 21. In the power unit in accordance with this embodiment, ten bolts 30 are inserted respectively to the insertion holes 21 while the junction surface 10 of the internal combustion engine 100 and the junction surface 20 of the hybrid transaxle 200 are placed in contact with each other as shown in FIG. 1, so that the internal combustion engine 100 and the hybrid transaxle 200 are integrally fastened together by the ten bolts 30.

Therefore, in the junction surface 20, there are ten bolt span portions 20a to 20j between the insertion holes 21 as shown in FIG. 2.

In order to restrain the production of vibration or noise caused by resonance as mentioned above in the power unit in accordance with the embodiment, a protrusion portion 25 is formed in a bolt span portion 20a, among the ten bolt span portions 20a to 20j, which is located in an upper portion of the hybrid transaxle 200 as shown in. FIG. 2. The protrusion portion 25 is protruded in the direction in which the internal combustion engine 100 and the hybrid transaxle 200 are fastened.

Incidentally, as shown in FIG. 1, an upper portion of the case of the hybrid transaxle 200 is provided with an opening portion 202. Inside the opening portion 202, a connector 270 for connecting a cable that supplies electric power to the motor-generator 210 is attached. Then, as shown in FIG. 2, a side surface of the case of the hybrid transaxle 200 is provided with an access hole 203 through which the mounting of the connector 270 is performed. Therefore, as shown in FIG. 2, the junction surface 20 has, in the bolt span portion 20a, a radially outwardly expanded shape such as to extend around the access hole 203. The length of the bolt span portion 20a is longer than that of the other bolt span portions.

Figure 3A:
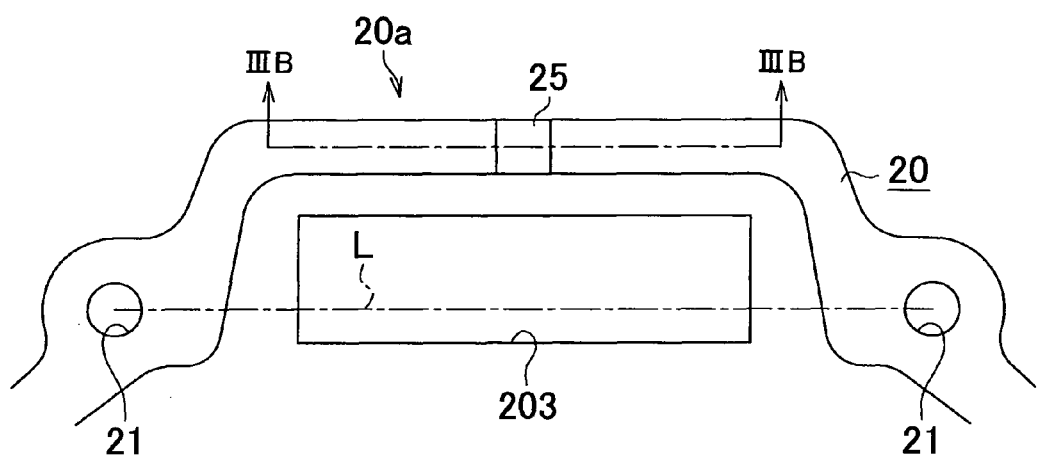
FIG. 3A is an enlarged view of a portion of a junction surface of a hybrid transaxle in accordance with an embodiment.

Hereinafter, with reference to FIGS. 3A, 3B and 4, the protrusion portion 25 provided in the bolt span portion 20a will be further described in detail. FIG. 3A is an enlarged view of a portion X enclosed by an interrupted line in FIG. 2, and FIG. 3B is a sectional view taken on line IIIB-IIIB in FIG. 3A.

As shown in FIG. 3A, since the junction surface 20 in the bolt span portion 20a expands to a radially outer side so as to keep away from the access hole 203, the junction surface 20 in the bolt span portion 20a is provided with an offset from the other bolt span portions so as to be apart from a straight line L that connects two insertion holes 21 that are located at opposite ends of the bolt span portion 20a.

Besides, due to the space restriction inside the engine compartment, an upper portion of the hybrid transaxle 200 has a flat surface, so that the locus of the bolt span portion 20a extends substantially linearly in the upper portion of the hybrid transaxle 200 as shown in FIG. 3A.

Figure 3B:
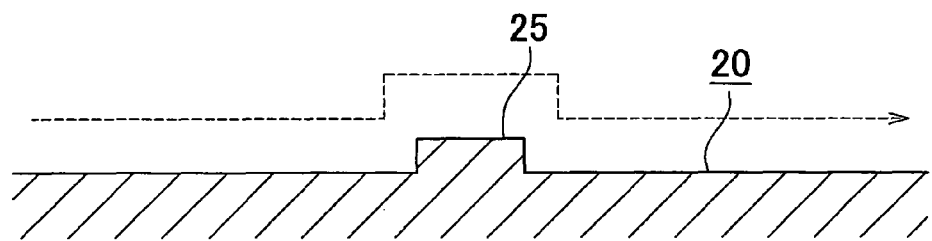
FIG. 3B is a sectional view taken on line IIIB-IIIB in FIG. 3A.

A central portion of the bolt span portion 20a is provided with the protrusion portion 25 that is protruded from the junction surface 20 as shown in FIG. 3B. This protrusion portion 25 is formed by altering the height of a cutting blade of a milling machine as shown by an interrupted line in FIG. 3B when the junction surface 20 is smoothed by a cutting process performed by the milling machine.

Incidentally, the position at which the protrusion portion 25 in the bolt span portion 20a is formed is set beforehand on the basis of results of an experiment so that the frequency of vibration transmitted from the hybrid transaxle 200 through the case and the eigen frequency of the bolt span portion 20a provided with the protrusion portion 25 do not overlap with each other.

For example, in the power unit of the embodiment, the position of the protrusion portion 25 is set so that the eigen frequency of each of the junction surfaces 10 and 20 at the bolt span portion 20a is higher than the frequency of the vibration that is caused by a mesh transmission error of the power splitting mechanism 230 and that is transmitted from the hybrid transaxle 200 through the case.

Figure 4A:
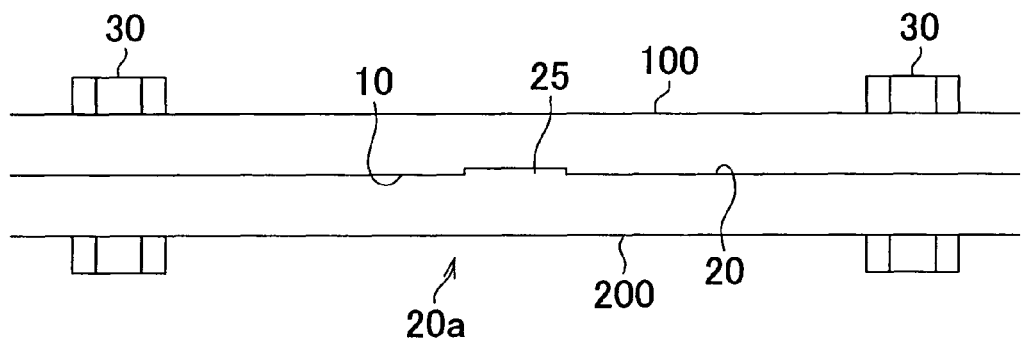
FIG. 4A is an enlarged view of a portion of a junction surface of a power unit in accordance with the embodiment.
Figure 4B:
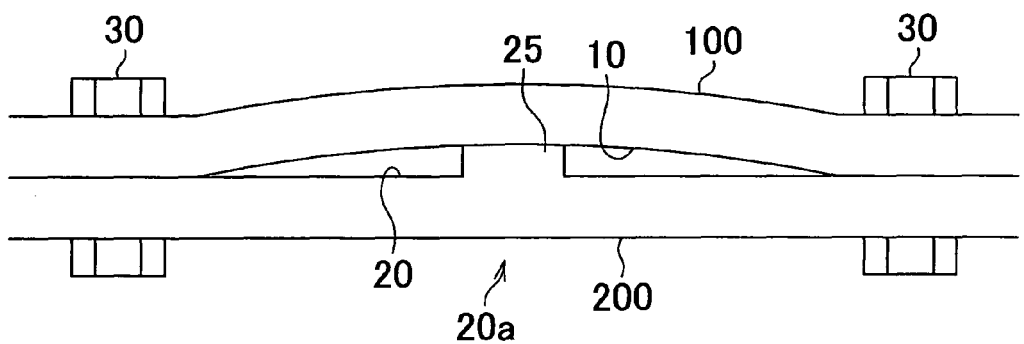
FIG. 4B is a schematic diagram showing a state of the junction surface that has been deformed due to thermal expansion.
Figure 5:
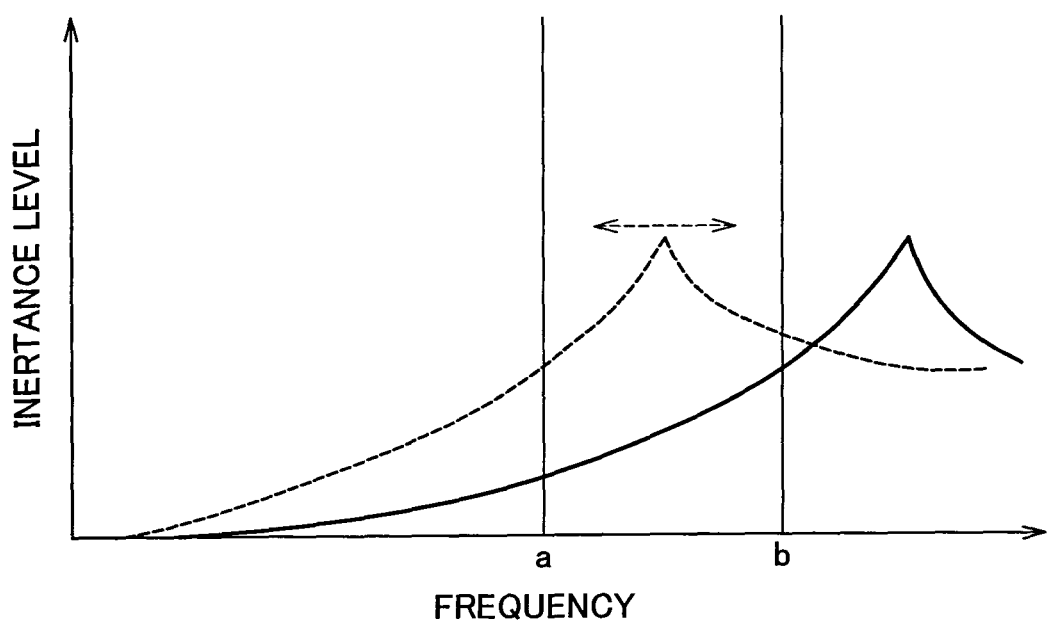
FIG. 5 is a graph showing a relation between the frequency and the inertance level of a bolt span portion of a power unit in accordance with the embodiment.

Operation that is achieved by providing the bolt span portion 20a with the protrusion portion 25 in this manner will be described with reference to FIGS. 4A, 4B and 5. FIG. 4A and FIG. 4B are schematic diagrams showing states of the junction surfaces 10 and 20 in a state where the internal combustion engine 100 and the hybrid transaxle 200 have been fastened together with the bolts 30. FIG. 5 is a graph showing a relation between the inertance level and the frequency of each of the junction surfaces 10 and 20 at the bolt span portion 20a.

When the internal combustion engine 100 and the hybrid transaxle 200 are fastened together with the bolts 30, the protrusion portion 25 is elastically deformed as shown in FIG. 4A by the pressing force that occurs between the junction surfaces 10 and 20 due to the fastening by the bolts 30. Besides, since the junction surface 10 of the internal combustion engine 100 that contacts the protrusion portion 25 also elastically deforms, the junction surfaces 10 and 20 closely contact each other as the fastening of the bolts 30 is carried out as shown in FIG. 4A. Incidentally, the height of the protrusion portion 25 is set so that the junction surfaces 10 and 20 closely contact each other as the protrusion portion 25 elastically deforms when the bolts 30 are fastened.

In the case where the junction surface 10 deforms so as to lengthen due to thermal expansion caused by operation of the engine, deformation occurs so that the junction surface 10 in the bolt span portion curves. As this deformation occurs, the junction surface 10 and the junction surface 20 more strongly contact each other in some portions of the bolt span portion, and the pressing force acting between the junction surface 10 and the junction surface 20 becomes weaker in some other portions of the bolt span portion. As a result, the vibration characteristic of the bolt span portion becomes unstable, and there arises a possibility of occurrence of resonance as stated above.

For example, as the junction surface 10 deforms due to thermal expansion as mentioned above, the junction surface 10 and the junction surface 20 may sometimes separate from each other as shown in FIG. 4B, so that a gap may be formed between the junction surfaces 10 and 20.

At such a time, in the power unit of this embodiment, the protrusion portion 25 that has been elastically deformed tends to restore its original shape. Therefore, the state of contact between the junction surface 10 and the protrusion portion 25 is maintained at a site where the protrusion portion 25 is provided, even when a gap is formed between the junction surfaces 10 and 20 as shown in FIG. 4B.

If a gap is formed between the junction surfaces 10 and 20 in a structure in which the protrusion portion 25 is not provided, the vibration characteristic of each of the junction surfaces 10 and 20 in the bolt span portion 20a becomes unstable as shown by an interrupted line in FIG. 5 since such a gap can be formed in various sizes and at various positions. Therefore, in some cases, the frequency at which the inertance level becomes high, that is, the eigen frequency of the junction surface 10 or 20, overlaps with the frequencies of the vibration transmitted from the hybrid transaxle 200 (in the range of a to b in FIG. 5). In consequence, there arises a possibility of resonance occurring in the bolt span portion 20a and therefore producing large vibration or noise when vibration is transmitted thereto from the hybrid transaxle 200 through the case.

In the power unit of the embodiment, however, since the protrusion portion 25 is provided in the bolt span portion 20a, the state of contact between the junction surface 10 and the protrusion portion 25 is maintained at the site where the protrusion portion 25 is provided, even when the junction surfaces 10 and 20 separate from each other to form a gap in the bolt span portion 20a due to, for example, thermal expansion caused by operation of the engine, or the like. Therefore, as shown by a solid line in FIG. 5, the vibration characteristic of each of the junction surfaces 10 and 20 in the bolt span portion 20a less easily changes than the vibration characteristic thereof in the case where the protrusion portion 25 is not provided.

Besides, since the position of the protrusion portion 25 is set so that the eigen frequency of each of the junction surfaces 10 and 20 in the bolt span portion 20a is higher than the frequency of the vibration transmitted from the hybrid transaxle 200 through the case (in the range of a to b in FIG. 5), the overlap between the frequency of the vibration transmitted and the eigen frequency becomes less likely. Therefore, it becomes less likely that resonance will occur in the bolt span portion 20a when vibration is transmitted thereto from the hybrid transaxle 200 through the case.

According to the foregoing embodiment, the following effects are achieved.

(1) When the junction surfaces 10 and 20 separate from each other to form a gap in the bolt span portion 20a due to deformation of the junction surfaces 10 and 20, or the like, that is caused by the processing variations of the junction surfaces 10 and 20, the mounting error caused when the bolts 30 are fastened, or the deformation of the junction surfaces 10 and 20 caused by thermal expansion occurring during operation of the engine, the protrusion portion 25, which has been elastically deformed, tends to restore its original shape while remaining in contact with the junction surface 10 that the protrusion portion 25 faces. Therefore, even when a gap is formed between the junction surfaces 10 and 20, the state of contact between the protrusion portion 25 and the junction surface 10 is maintained at the site where the protrusion portion 25 is provided. Hence, the junction surfaces 10 and 20 are supported by each other via the protrusion portion 25, the vibration of the junction surfaces 10 and 20 at this gap can be restrained. That is, the embodiment is able to restrain the vibration or noise that is produced at the junction surfaces 10 and 20 of the internal combustion engine 100 and the hybrid transaxle 200 due to the vibration transmitted thereto from the hybrid transaxle 200.

(2) The position at which the protrusion portion 25 is provided is set on the basis of the frequency of the vibration transmitted thereto from the hybrid transaxle 200 so that the eigen frequency of the bolt span portion 20a that is provided with the protrusion portion 25 does not overlap with the frequency of the vibration transmitted thereto from the hybrid transaxle 200. Therefore, even in the case where the junction surfaces 10 and 20 separate from each other to form a gap in the bolt span portion 20a as the junction surfaces 10 and 20 deform due to, for example, thermal expansion caused by the operation of the engine, or the like, the occurrence of resonance caused in the bolt span portion 20a by the vibration transmitted thereto from the hybrid transaxle 200 is restrained. In consequence, the occurrence of large vibration or noise caused by the resonance can be restrained.

(3) The protrusion portion 25 is formed by changing the height of the cutting blade of a milling machine at positions that correspond to the protrusion portion 25 during a cutting process of smoothing the junction surface 20. Therefore, the protrusion portion 25 can be formed in the cutting (or machining) process for smoothing the junction surface 20. Thus, it is possible to form the protrusion portion 25 in the bolt span portion 20a while restraining the increase in the number of operation steps caused by the provision of the protrusion portion 25 and the thereby-caused increase in cost.

The foregoing embodiment may be carried out in the following modified or changed forms. Although in the foregoing embodiment the locus of the junction surface 20 in the bolt span portion 20a has an offset and the protrusion portion 25 is provided only in the bolt span portion 20a that is longer than the other bolt span portions 20b to 20j, embodiments of the invention are not limited so. For example, each of the other bolt span portions 20b to 20j may also be provided with a protrusion portion 25.

However, in a portion where the locus of the junction surface has an offset as in the bolt span portion 20a, the fastening force caused by fastening bolts 30 does not easily or certainly act on the junction surfaces 10 and 20. Therefore, in order to restrain the occurrence of vibration or noise in a gap that is formed between the junction surfaces 10 and 20, the foregoing embodiment adopts a construction in which a protrusion portion 25 is provided at least in the bolt span portion 20a that has an offset, among the bolt span portions 20a to 20j.

The farther a point is from its adjacent insertion hole 21 through which a bolt 30 is inserted, the less easily or certainly the pressing force caused by the fastening of the bolt 30 acts on the junction surfaces 10 and 20. Therefore, in a bolt span portion whose locus is long, the junction surfaces 10 and 20 are particularly apt to separate from each other, so that the production of vibration or noise at a gap formed between the junction surfaces 10 and 20 becomes conspicuous.

Therefore, in order to suitably restrain the production of vibration or noise at a gap formed between the junction surfaces 10 and 20, the foregoing embodiment may adopt a construction in which the bolt span portion 20a that has the longest locus of all the bolt span portions 20a to 20j is provided with the protrusion portion 25.

Besides, in the case where the locus of the junction surface 20 linearly extends as in the bolt span portion 20a, the junction surfaces 10 and 20 are more likely to vibrate when vibration is transmitted thereto than in the case where the locus of the junction surface 20 is curved. Therefore, in order to restrain vibration of the junction surfaces 10 and 20, the foregoing embodiment may also have a construction in which the protrusion portion 25 is provided in the bolt span portion 20a in which the junction surface 20 linearly extends.

Although in the foregoing embodiment, the protrusion portion 25 is provided on the junction surface 20 of the hybrid transaxle 200, the embodiments of the invention are not limited so. That is, the junction surface 10 of the internal combustion engine 100 may instead be provided with a protrusion portion 25.

Besides, it is also permissible to provided protrusion portions 25 on both the junction surface 20 of the hybrid transaxle 200 and the junction surface 10 of the internal combustion engine 100. Although in the foregoing embodiment, the protrusion portion 25 is provided substantially at the center of the bolt span portion 20a as shown in FIG. 3A, the embodiments of the invention are not limited so, that is, the position at which the protrusion portion 25 is provided may be appropriately changed. Incidentally, in order to restrain the occurrence of resonance of the junction surfaces 10 and 20 caused by vibration transmitted thereto from the hybrid transaxle 200, the frequency of the vibration transmitted from the hybrid transaxle 200 to the junction surfaces 10 and 20 may be analyzed on the basis of results of experiments or the like performed beforehand, and the position at which a protrusion portion 25 is provided may be set on the basis of the analysis. Concretely, in order to effectively restrain the occurrence of resonance, the position of the protrusion portion 25 may be set so that the eigen frequency of the bolt span portion that is provided with the protrusion portion 25 does not overlap with the frequency of the vibration transmitted thereto from the hybrid transaxle 200.

Although in the foregoing embodiment, the bolt span portion 20a is provided with only one protrusion portion 25, the embodiments of the invention are not limited so, that is, the number of protrusion portions 25 provided in a given bolt span portion may be changed as appropriate. Incidentally, in order to restrain the occurrence of resonance of the junction surfaces 10 and 20 caused by vibration transmitted thereto from the hybrid transaxle 200, the frequency of the vibration transmitted from the hybrid transaxle 200 to the junction surfaces 10 and 20 may be analyzed on the basis of results of experiments or the like performed beforehand, and the number of protrusion portions 25 to be provided may be set on the basis of the analysis. Concretely, in order to effectively restrain the occurrence of resonance, the number of protrusion portions 25 may be set so that the eigen frequency of the bolt span portion that is provided with the protrusion portion 25 does not overlap with the frequency of the vibration transmitted thereto from the hybrid transaxle 200.

Besides, the waveform of the eigen vibration that occurs in a bolt span portion due to vibration transmitted to the junction surfaces 10 and 20 through the case may be analyzed beforehand, and the position and/or number of protrusion portions 25 may be set according to the waveform.

Figure 6:
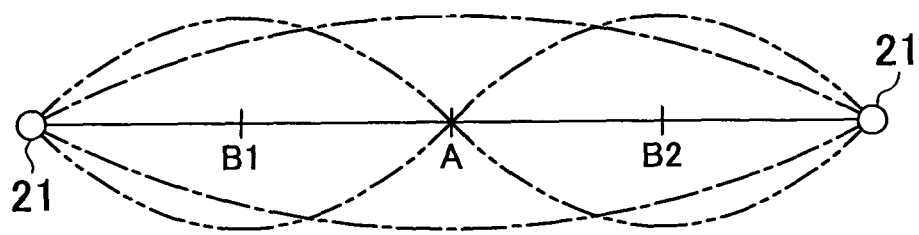
FIG. 6 is a schematic diagram showing a relation between the waveform of eigen vibration that occurs on the bolt span portion, and the position at which a protruded portion is provided.

For example, in the case where eigen vibration whose amplitude becomes maximum at the center between insertion holes 21 as shown by dashed one-dotted line in FIG. 6 (the center is shown by A in FIG. 6) occurs, a protrusion portion 25 may be formed at the position A at which the amplitude of the eigen vibration becomes maximum. Besides, in the case where eigen vibration whose amplitude becomes maximum at two points B1 and B2 shown in FIG. 6 with a node being at the center between two insertion holes 21 as shown by a dashed two-dotted line in FIG. 6 occurs, protrusion portions 25 may be formed at the position B1 and B2 at which the amplitude of eigen vibration becomes maximum. Incidentally, in this case, it is also permissible to provide a protrusion portion 25 at either one of the positions B1 and B2.

If the construction in which a protrusion portion 25 is provided at a position in a bolt span portion at which the amplitude of eigen vibration becomes maximum is adopted, the protrusion portion 25 contacts, at this position, the junction surface 10 that the protrusion portion 25 faces. Therefore, vibration of the junction surfaces 10 and 20 at this position is effectively restrained, and the occurrence of eigen vibration is restrained.

Although in the foregoing embodiments, the protrusion portion 25 is formed by changing the height of the cutting blade of a milling machine during a cutting (or machining) process for smoothing the junction surface 20, the embodiments of the invention are not limited so, that is, the method of forming a protrusion portion 25 may be changed as appropriate. For example, it is also permissible to adopt a construction in which a protrusion portion 25 is formed by fixing a platy member to a smooth junction surface 10 or 20. Incidentally, the platy member that is fixed to the junction surface 10 or 20 may be made of a metal tape that has elasticity, or the like.

Incidentally, in order to effectively restrain the occurrence of resonance, the material or shape of the member to be fixed may be appropriately changed according to the characteristic of the vibration transmitted thereto, the characteristic of the junction surfaces 10 and 20, etc. Although in the foregoing embodiments, the fastening structure of a power unit in accordance with the invention is applied to the power unit that is constructed by fastening the internal combustion engine 100 and the hybrid transaxle 200 together, the fastening structure of a power unit in accordance with the invention may also be applied to a power unit in which another transmission and the internal combustion engine 100 are fastened together.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A fastening structure of a power unit formed by fastening an internal combustion engine and a transmission, comprising:
  a first junction surface provided on the internal combustion engine;
  a second junction surface provided on the transmission;
  a plurality of bolts which are respectively inserted into a plurality of insertion holes that are formed in the first junction surface and second junction surface, and which integrally fasten the internal combustion engine and the transmission together while the first junction surface and the second junction surface are placed in contact with each other,
  wherein at least one of the first junction surface and the second junction surface includes a bolt span portion positioned between insertion holes, the bolt span portion located at a position of contact between the first junction surface and the second junction surface; and a protrusion portion provided in the bolt span portion,
wherein the protrusion portion is integral with and protrudes from a part of the bolt span portion in a direction in which the internal combustion engine and the transmission are fastened, and the protrusion portion contacts the one of the first junction surface and the second junction surface that the protrusion portion faces, and
wherein the junction surfaces have an offset from a straight line that connects two of the insertion holes that are positioned at opposite ends of the bolt span portion in which the protrusion portion is provided.

2. The fastening structure according to claim 1, wherein the protrusion portion elastically deforms due to pressing force caused by fastening of the internal combustion engine and the transmission via the bolts in such an elastic deformation manner that the junction surface of the internal combustion engine and the junction surface of the transmission closely contact each other.

3. The fastening structure according to claim 1, wherein the protrusion portion is provided at a position in the bolt span portion, such that a frequency of vibration transmitted from the transmission does not overlap with an eigen frequency of the bolt span portion provided with the protrusion portion.

4. The fastening structure according to claim 1, wherein the bolt span portion is provided with a number of protrusion portions such that a vibration transmitted from the transmission does not overlap with an eigen frequency of the bolt span portion provided with the protrusion portions.

5. The fastening structure according to claim 1, wherein the protrusion portion is provided at a position at which an amplitude of eigen vibration that occurs in the bolt span portion due to vibration that is transmitted from the transmission to the junction surfaces is maximum.

6. The fastening structure according to claim 1, wherein the fastening structure is at least partially defined by a waveform of eigen vibration analyzed beforehand.

7. The fastening structure according to claim 1, wherein the bolt span portion in which the protrusion portion is provided has a longer locus on the junction surfaces that connects two of the insertion holes that are at opposite ends of the bolt span portion than another bolt span portion has.

8. The fastening structure according to claim 1, wherein the bolt span portion in which the protrusion portion is provided is a portion in which an end portion of the junction surfaces linearly extends.

9. The fastening structure according to claim 1, wherein:
the junction surfaces are formed by a cutting process performed by a milling machine such that the junction surfaces are smooth; and
the protrusion portion is formed by changing height of a cutting blade of the milling machine at a position corresponding to the protrusion portion, during the cutting process.

10. The fastening structure according to claim 1, wherein the protrusion portion is formed by fixing a plate member onto at least one of the junction surfaces that is smooth.

* * * * *